United States Patent
Deason

(10) Patent No.: US 10,864,923 B2
(45) Date of Patent: Dec. 15, 2020

(54) SINGLE POLE AERIAL TRAMWAY APPARATUS FOR CYCLES

(71) Applicant: Kelly J. Deason, Medford, OR (US)

(72) Inventor: Kelly J. Deason, Medford, OR (US)

(*) Notice: Subject to any disclaimer, the term of this patent is extended or adjusted under 35 U.S.C. 154(b) by 406 days.

(21) Appl. No.: 15/977,034

(22) Filed: May 11, 2018

(65) Prior Publication Data

US 2018/0345995 A1 Dec. 6, 2018

Related U.S. Application Data

(60) Provisional application No. 62/515,982, filed on Jun. 6, 2017.

(51) Int. Cl.
*B61B 12/00* (2006.01)
*B62H 3/08* (2006.01)
*B62H 3/00* (2006.01)

(52) U.S. Cl.
CPC .............. *B61B 12/002* (2013.01); *B62H 3/00* (2013.01); *B62H 3/08* (2013.01)

(58) Field of Classification Search
CPC .......... B61B 12/002; B62H 3/00; B62H 3/08; B60R 9/10
See application file for complete search history.

(56) References Cited

U.S. PATENT DOCUMENTS

| 4,149,471 | A | * | 4/1979 | Tauzin | ............ | B61B 12/002 |
|---|---|---|---|---|---|---|
| | | | | | | 104/173.2 |
| 8,827,363 | B2 | | 9/2014 | Lagier | | |
| 2018/0345995 | A1 | * | 12/2018 | Deason | ............ | B62H 3/08 |

FOREIGN PATENT DOCUMENTS

| EP | 1466819 | 10/2004 |
|---|---|---|
| FR | 2900394 | 11/2007 |
| FR | 2929575 | 10/2009 |
| FR | 2958255 | 10/2011 |
| JP | H0544743 | 6/1993 |
| JP | 2016187972 | 11/2016 |

OTHER PUBLICATIONS

Leitner Poma of America, Sommital (Jun. 2014), www.leitner-poma.com.

* cited by examiner

*Primary Examiner* — Zachary L Kuhfuss
(74) *Attorney, Agent, or Firm* — Jerry Haynes Law

(57) ABSTRACT

A single pole aerial tramway apparatus carries multiple cycles in an upright position along the path of overhead cables from an aerial tramway. A single, bowed pole supports a multi-cycle support assembly on which multiple cycles are mounted. The bowed pole has a medial region that arcs distally from the cycles, so as to create additional space for loading and carrying the cycles. A bracket forms a junction point that detachably connects a pole cable end of the bowed pole to a cable extension member from the cable. The bracket may be hinged to enable the pole to sway to reduce mechanical stress. A multi-cycle support assembly attaches to the pole cycle end. A primary stabilization bar and a secondary stabilization bar carry and balance the multi-cycle support assembly. Cycle racks set on the stabilization bars receive the cycles in a front tire depression and a rear tire brace.

15 Claims, 3 Drawing Sheets

SINGLE POLE AERIAL TRAMWAY APPARATUS FOR CYCLES

CROSS-REFERENCE TO RELATED APPLICATIONS

This application claims the benefits of U.S. provisional application No. 62/515,982, filed Jun. 6, 2017 and entitled SINGLE POLE HANGER BIKE CARRIER, which provisional application is incorporated by reference herein in its entirety.

FIELD OF THE INVENTION

The present invention relates generally to a single pole aerial tramway apparatus for carrying cycles on an aerial tramway. More so, the present invention relates to an aerial tramway apparatus that is operational with an aerial lift to carry multiple cycles in an upright position along an elevated path of the overhead cables; that supports the cycles from a bowed pole configured to arc away from the cycles, so as to enable upright orientation and to create additional space for multiple cycles to be carried simultaneously; and that provides a hinged bracket to enable the multi-cycle support assembly carrying the cycles to sway in a pendulum motion while being carried, such that mechanical stress is reduced.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, an aerial tramway, or gondola lift, is an aerial cable transport supported and propelled by cables from above. The aerial tramway consists of a loop of steel cable that is strung between two stations, sometimes over intermediate supporting towers. Often, aerial tramways are operational in the high mountains and on the slopes of many low mountain range. Aerial tramways can be used to transport humans, animals, produce, and even other transportation devices, such as cycles.

It is known that mountain biking is a popular recreational sport often performed in rugged trails and mountains. In many instances, there is a need to transport the mountain bikes to a starting point at the upper regions of the mountains, such as for a downhill race. The need for extensive and rapid transport of mountain bikes can be provided by aerial tramways. The use of aerial tramway can be especially useful when the starting point of the race on the mountain height is not reached by a paved road. Loading the mountain bikes on the aerial tramway, and stabilizing the mountain bikes during transport can, however, be problematic.

Generally, aerial tramways carry cabins at high elevations, where strong winds buffet the cable and cabins of the aerial tramway. This can lead to mechanical stress on the components of the atrial tramway. In one instance, allowing for a free, pendulum motion that is induced by moving a load from one position to another, while it is suspended by cables can help alleviate the mechanical stress.

Other proposals have involved aerial tramways for bicycles. The problem with these aerial tramways is that they do not provide a single, bowed pole to support the cycles. Also, the cycles are not carried on a dedicated cycle rack. Even though the above cited aerial tramways meet some of the needs of the market, a single pole aerial tramway apparatus for carrying cycles on an aerial tramway. More so, the present invention relates to an aerial tramway apparatus that is operational with an aerial lift to carry multiple cycle sin an upright position along an elevated path of the overhead cables; that supports the cycles from a bowed pole configured to arc away from the cycles, so as to enable upright orientation and to create additional space for multiple cycles to be carried simultaneously; and that provides a hinged bracket to enable the multi-cycle support assembly carrying the cycles to sway in a pendulum motion while being carried, such that mechanical stress is reduced is still desired.

SUMMARY

Illustrative embodiments of the disclosure are generally directed to a single pole aerial tramway apparatus that is configured to carry multiple cycles from an aerial tramway. The aerial tramway is supported and propelled by overhead cables. The apparatus is carried along the path of the overhead cables while supporting multiple cycles in an upright position.

In one non-limiting embodiment, the apparatus comprises a bowed pole that supports a multi-cycle support assembly used to carry multiple cycles in the upright position. The bowed pole is defined by a pole cable end near the cables, a pole cycle end, and a medial region. The medial region bows distally from the cycles, so as to create additional space for multiple cycles to be carried loaded and unloaded on a multi-cycle support assembly.

The pole cable end terminates at a bracket, which forms a detachable nexus between the pole and a cable extension member from the overhead cable. In one alternative embodiment, the bracket is hinged. Such a hinged bracket configuration pivotally connects the cable extension member to the pole cable end, so as to enable the multi-cycle support assembly to sway in a pendulum motion. This pendulum motion helps to reduce mechanical stress that is naturally induced by carrying cycles along an elevated path from an overhead cable.

The bowed pole also has a lower pole cycle end that connects to the multi-cycle support assembly. The multi-cycle support assembly securely mounts the cycles in an upright position during the lift. The multi-cycle support assembly includes a primary stabilization bar and at least one secondary stabilization bar joined to the cycle end of the bowed pole. The stabilization bars help balance the cycles during transport.

The multi-cycle support assembly further includes a plurality of parallel, spaced-apart cycle racks set perpendicularly on the primary stabilization bar and secondary stabilization bar. The cycle racks comprise a front tire depression for cradling a front tire of the cycle, and a rear tire brace for cradling a rear tire of the cycle. The cycles are loaded directly onto the cycle racks, with the front tire setting into the front tire depression, and the rear tire aligning into the rear tire brace. A front tire alignment member and a pair of lateral stabilization bars help retain the cyclers on the cycle racks.

One objective of the present invention is to carry multiple cycles in an upright position on an aerial tramway.

Another objective is to carry a multi-cycle support assembly with a bowed pole that bows out distally from the multi-cycle support assembly, so as to provide greater space for the cycles.

Yet another objective is to provide a bowed pole having sufficient durability to support the weight of multiple cycles, and strong winds at high elevations.

Yet another objective is to enable detachable attachment between the apparatus and the overhead cable of the aerial tramway.

Yet another objective is to provide a secondary stabilization bar rearward of the primary stabilization bar to support the rear weight of the cycles.

Yet another objective is to balance the weight of the multi-cycle support assembly 108 laterally with a primary stabilization bar and a secondary stabilization bar.

Yet another objective is to enable the bracket to pivot about the cable extension member, so as to reduce stress on the pole and multi-cycle support assembly.

Yet another objective is to provide an easy to detach bowed pole to a cable for an aerial tramway.

Yet another objective is to provide a front tire depression and a rear tire brace to the cycle rack, so as to secure the cycles in the upright position during transport on the aerial tramway.

Yet another objective is to provide an inexpensive to manufacture single pole aerial tramway apparatus for cycles.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
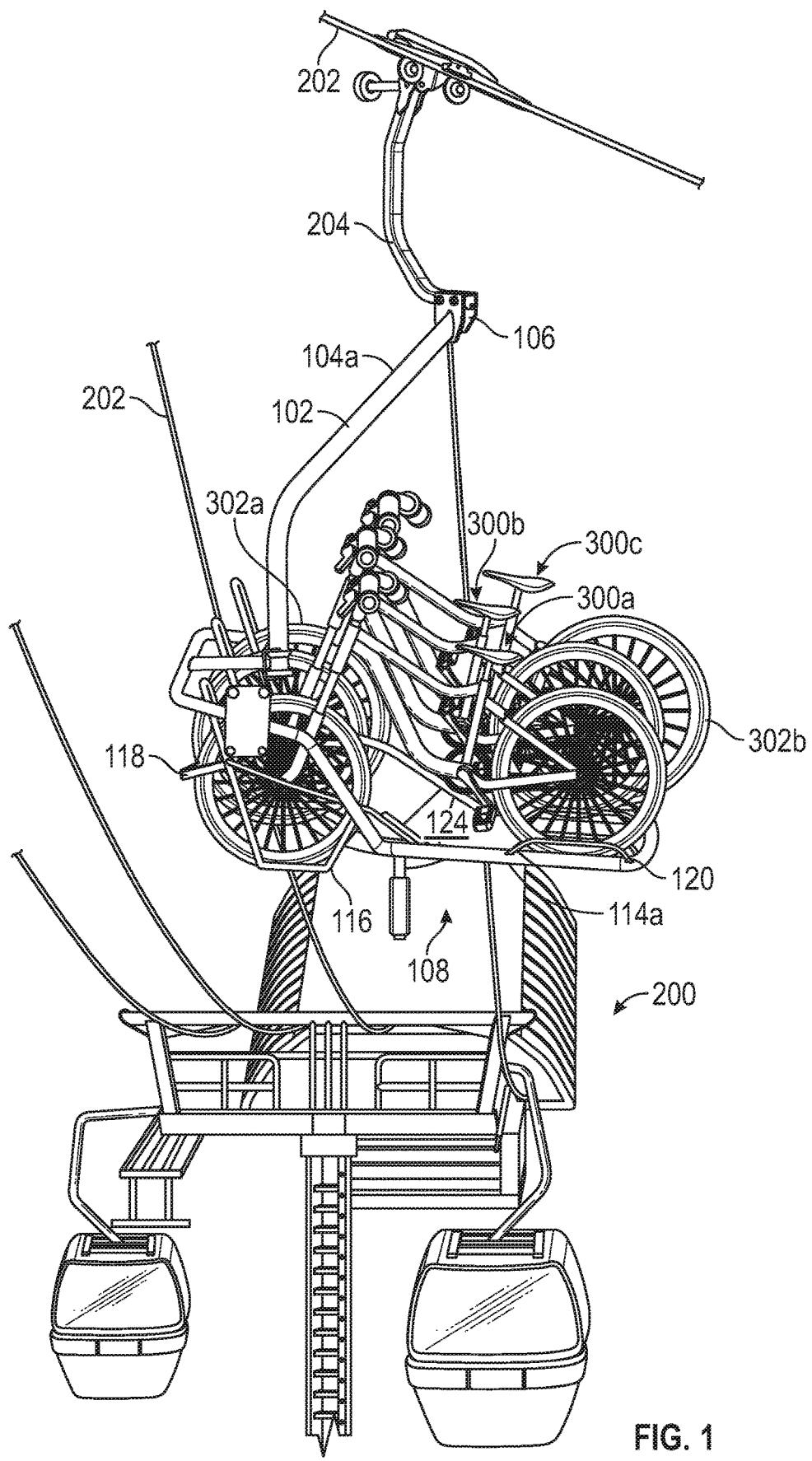
FIG. 1 illustrates a perspective view of an exemplary single pole aerial tramway apparatus carrying multiple cycles, in accordance with an embodiment of the present invention.
Figure 2:
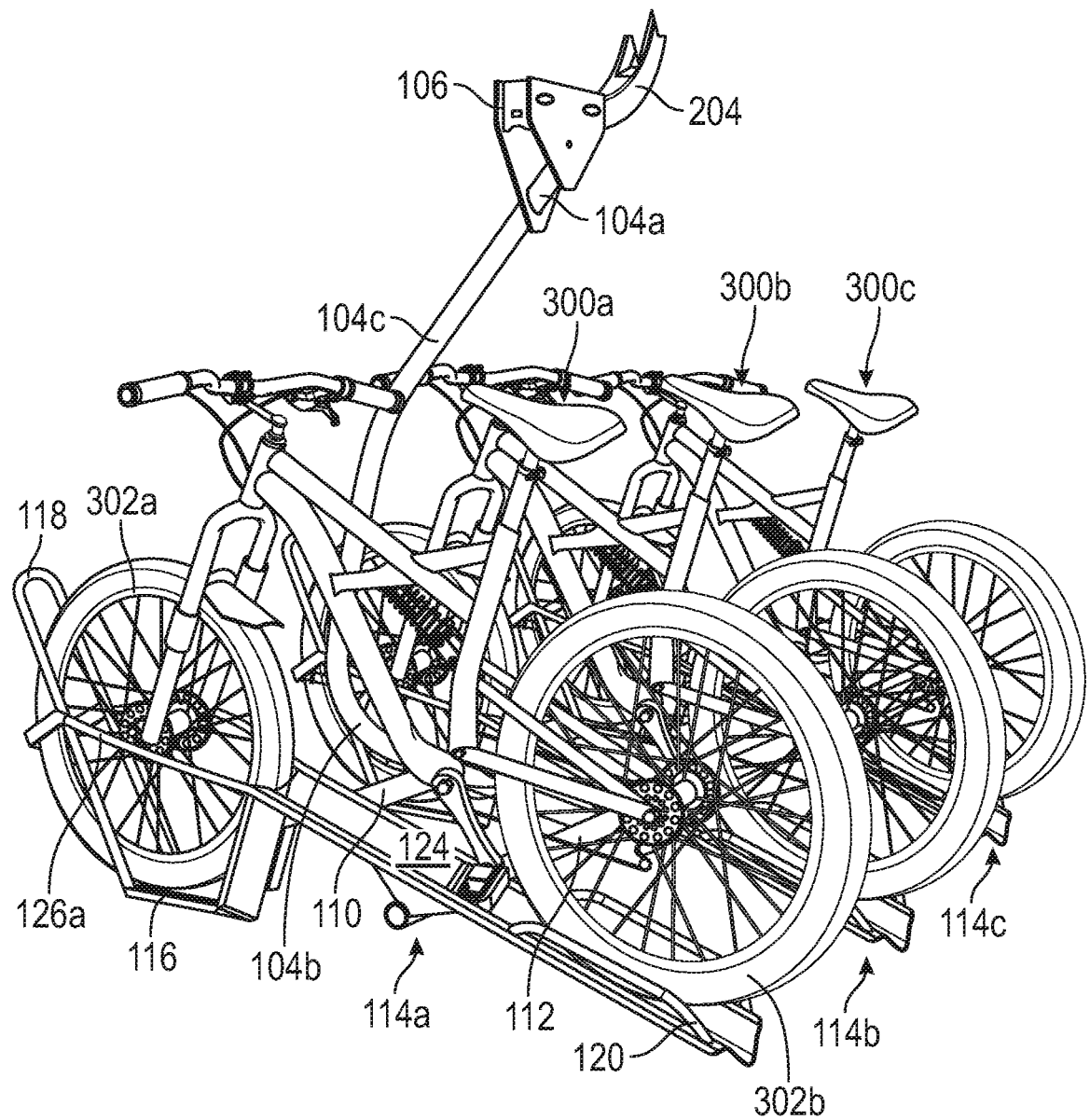
FIG. 2 illustrates a perspective view of the single pole aerial tramway apparatus, showing an exemplary bowed pole supporting an exemplary multi-cycle support assembly, in accordance with an embodiment of the present invention.
Figure 3:
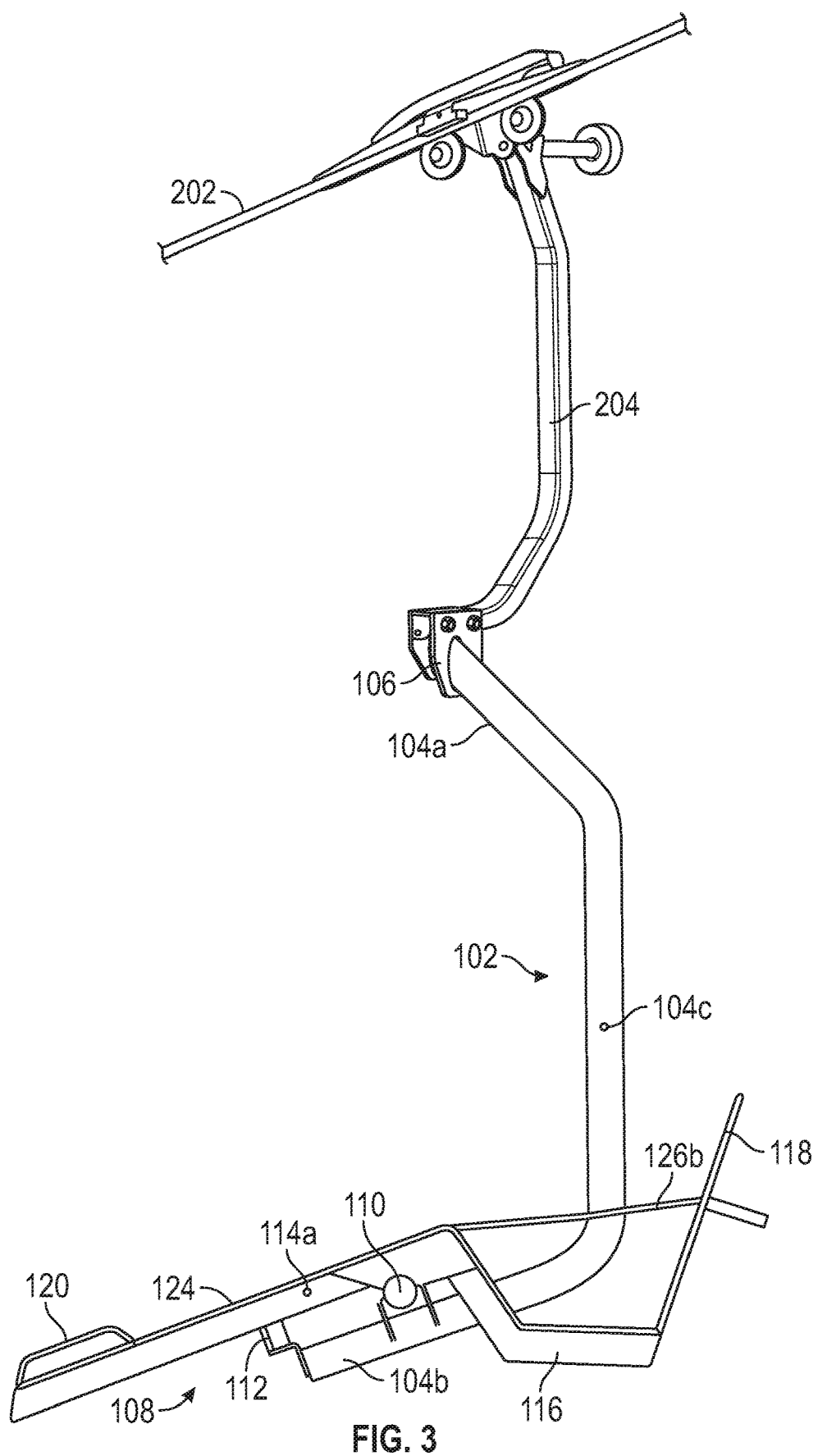
FIG. 3 illustrates an elevated side view of an exemplary single pole aerial tramway apparatus carrying multiple cycles, in accordance with an embodiment of the present invention.

A single pole aerial tramway apparatus 100 for cycles is referenced in FIGS. 1-3. The single pole aerial tramway apparatus 100, hereafter "apparatus 100", provides a unique extension for an aerial tramway 200 that carries multiple cycles 300a-c in an upright position. The apparatus 100 is operational with an aerial tramway 200 that is supported and propelled by overhead cables 202. The apparatus 100 is carried along the path of the overhead cables 202 while supporting multiple cycles 300a-c in the upright position.

The apparatus 100 provides a single, bowed pole 102, serving as nexus between the overhead cable 202, and a multi-cycle support assembly 108 that securely retains the cycles 300a-c. The bowed configuration of the bowed pole 102 is configured to bows outwardly; distally from the multi-cycle support assembly 108, so as to create space for loading and unloading cycles 300a-c. In one alternative embodiment, the apparatus 100 utilizes a hinged bracket 106 between the cables 202 and the bowed pole 102 that allows the bowed pole 102 and the multi-cycle support assembly 108 to sway in a pendulum motion, so as to reduce mechanical stress on the apparatus 100.

In some embodiments, the apparatus 100 simultaneously supports multiple cycles 300a-c. The cycles 300a-c may include, without limitation, a bicycle, a mountain bike, an electric bike, a tricycle, a unicycle, a motor cycle, and a scooter. The aerial tramway 200 may include an aerial/gondola lift that uses a cable transport, such as a ski lift, consisting of a loop of steel cable strung in an elevated position between two stations, and over intermediate supporting towers.

As referenced in FIG. 1, apparatus 100 comprises a single, bowed pole 102. The use of a single pole to support multiple cycles 300a-c reduces material costs. The bowed pole 102 also bows outwardly to create greater space for loading and unloading the cycles 300a-c. In one non-limiting embodiment, the bowed pole 102 is defined by a pole cable end 104a, a pole cycle end 104b, and a medial region 104c. The pole cable end 104a is proximal to the overhead cable 202 of the aerial tramway 200. The pole cycle end 104b is more distal, and at a lower elevation to the cables 202. At the medial region 104c, the bowed pole 102 is configured to arc outwardly, or towards the forward end of the apparatus 100. The forward end is oriented toward the front tire 302a of the cycles 300a-c, while mounted in the cycle racks 114a-c.

The bowed pole 102 is configured to bow outwardly at the medial region 104c, and then follow a path rearwardly at the pole cycle end 104b, towards the rear tire 302b of the cycles 300a-c. Looking at FIG. 2, the bowed pole 102 is bowed, so as to create space for the handle bars and front tire 302a of the cycle 300a. This allows an operator more space to load and unload the cycles 300a-c onto their respective cycle racks 114a-c.

Moving down the bowed pole 102, the pole cycle end 104b is generally perpendicular to the medial region 104c and the pole cable end 104a. The pole cycle end 104b curves rearwardly to achieve the perpendicular orientation to the medial region 104c and pole cable end 104a. In this manner, the pole cycle end 104b of the bowed pole 102 orients in a generally horizontal direction, supporting the multi-cycle support assembly 108 that caries the cycles 300a-c.

As illustrated in FIG. 1, the apparatus 100 further includes a bracket 106 that is disposed at the pole cable end 104a. The bracket 106 provides an intermediate component for fixing the pole cable end 104a of the bowed pole 102 to a cable extension member 204 that extends from the overhead cable 202. Cable extension member 204 may include a bar or roller that is a component of the aerial tramway 200. The bracket 106 forms a detachable nexus between the pole cable end 104a of the bowed pole 102, and a cable extension member 204 from the overhead cable 202.

The bracket 106 serves as a secure, yet detachable connection point that allows an operator to detach the apparatus 100 from the cable extension member 204 of the cable 202 from the aerial tramway 200. This may be accomplished with minimal tools or skill set. Additionally, the bracket 106 serves as a reinforcing mechanical component that helps carry the weight of the apparatus 100 and the cycles 300a-c being supported therefrom.

In one non-limiting embodiment, grip jaws provide the double function of supporting the weight of the apparatus 100 and of locking the bowed pole 102 on the cable 202. In other embodiments, various fasteners may, however, be used to connect the bracket 106 to the pole cable end 104a and cable extension member 204, including bolts, screws, pins, and magnets. The bracket 106 may also provide sidewalls that prevent debris and moisture from engaging the pole cable end 104a and the cable extension member 204.

In one alternative embodiment, the bracket 106 forms a hinged junction point; and thereby allows the bowed pole 102 to pivot in relation to the cable extension member 204. Such a hinged bracket 106 configuration is possible because of a hinge member 122 that operates in the bracket 106. The hinge member 122 may include an axle and bearings about which the pole cable end 104a of the bowed pole 102 pivots. The hinge member 122 may also include a hook and bar arrangement. In any case, the hinge member 122 provides a nexus between the cable extension member 204 and the pole cable end 104a.

In such a hinged configuration, the pivotal relationship between the hinged bracket 106 and the cable extension member 204 from the overhead cable 202 enables the multi-cycle support assembly 108 to sway in a pendulum motion. This pendulum motion helps to reduce mechanical stress that is naturally induced by carrying a heavy load, such as multiple cycles 300a-c, along an elevated path from an overhead cable 202. Those skilled in the art will recognize that at higher elevations, the apparatus 100 must withstand strong winds; and thereby require stress relief through the swaying motion.

As illustrated in FIG. 3, a multi-cycle support assembly 108 joins to the pole cycle end 104b. The multi-cycle support assembly 108 hangs from the pole cycle end 104b of the bowed pole 102, while receiving and stabilizing the cycles 300a-c in a secure fashion. In the hinged configuration of the bracket 106, described above, the multi-cycle support assembly 108 sways in a pendulum motion with the bowed pole 102, so as to reduce mechanical stress induced from heavy winds, or the natural motion of the overhead cables 202.

In one embodiment, the multi-cycle support assembly 108 comprises a primary stabilization bar 110 and at least one secondary stabilization bar 112. The primary stabilization bar 110 connects perpendicularly to the pole cycle end 104b of the bowed pole 102 at a forward position, proximal to the front tire 302a of the cycle 300a. Thus, the primary stabilization bar 110 extends perpendicularly across the medial region 104c of the bowed pole 102, so as to stabilize the front tire 302a section and frame of the cycles 300a-c. This helps balance the multi-cycle support assembly 108 laterally.

The secondary stabilization bar 112 also connects perpendicularly to the pole cycle end 104b of the bowed pole 102, but more proximal to the rear tire 302b of the cycles 300a-c. The secondary stabilization bar 112 is disposed in a parallel, spaced-apart relationship with the primary stabilization bar 110. The secondary stabilization bar 112 extends perpendicularly across the horizontally disposed pole cycle end 104b of the bowed pole 102, so as to stabilize the rear tire 302b section and frame of the cycles 300a-c.

The primary stabilization bar 110 and the secondary stabilization bar 112 help balance the weight of the multi-cycle support assembly 108 laterally. In this manner, only a portion of the cycle racks 114a-c may be loaded with a cycle 300a-c, and the multi-cycle support assembly 108 remains balanced on the bowed pole 102. For example, a cycle 300a can be loaded on the terminal left side of the multi-cycle support assembly 108, while two cycles 300b, 300c can be loaded on the terminal right side of the multi-cycle support assembly 108.

Both the primary stabilization bar 110 and the secondary stabilization bar 112 extend across the entire length of the cycles 300a-c. In one non-limiting embodiment, the primary stabilization bar 110 is a wide rectangular bar, and the secondary stabilization bar 112 is a cylindrical pipe, generally smaller than the primary stabilization bar 110. Suitable materials for the stabilization bars 110, 112 may include aluminum, galvanized steel, metal alloys, and a rigid polymer.

Looking back as FIG. 2, the apparatus 100 provides a plurality of cycle racks 114a-c attached perpendicularly to the primary stabilization bar 110 and the secondary stabilization bar 112. The cycle racks 114a, 114b, 114c directly receive the cycles 300a, 300b, 300c in a parallel, spaced-apart disposition relationship to each other. In one embodiment, the cycle racks 114a-c comprise an elongated panel 124 defined by a front tire depression 116 and a rear tire brace 120. The panel 124 may have a textured surface to minimize slippage as the cycles 300a-c are rolled on and off the cycle 300a-c rack.

Each cycle 300a-c rolls onto its respective cycle rack 114a-c, independently of the other. A front tire alignment member 118 provides an upper, elongated U-shape that holds the front tire 302a down into the front tire depression 116. The front tire alignment member 118 may hinge about the front tire 302a alignment to further secure the front tire 302a.

In one non-limiting embodiment, a pair of lateral front tire alignment shafts 126a, 126b holds the front tire 302a from the sides into the front tire depression 116. The lateral front tire alignment shafts 126a-b are positioned on both sides of the front tire 302a. As the front tire 302a is set into the front tire depression 116, the front tire alignment member 118 and the lateral front tire alignment shafts 126a-b work together to securely retain the front tire 302a into the front tire depression 116. In some embodiments, the front tire alignment member 118 may hinge about the front tire 302a to enable facilitated removal of the front tire 302a from the front tire depression 116. A rear tire brace 120 securely retains the rear tire 302b into the rear section of the panel 124.

In operation, the apparatus 100 attaches to the aerial tramway 200 in a detachable manner that allows for interchangeability and facilitated access for maintenance. The bracket 106 affixes between the pole cable end 104a of the bowed pole 102, and the cable extension member 204 from the overhead cable 202 of the aerial tramway 200. Various fasteners may be used to connect the bracket 106 to the pole cable end 104a and cable extension member 204, including jaws, bolts, screws, pins, and magnets. The bowed pole 102 and multi-cycle support assembly 108 hang down from the cable 202. In an alternative embodiment, a hinged configuration of the bracket 106 allows the bowed pole 102 to sway in a pendulum motion about the cable extension member 204.

The cycles 300a-c are loaded directly onto the cycle racks 114a-c, with the front tire 302a setting into the front tire depression 116, and the rear tire 302b aligning into the rear tire brace 120. A front tire alignment member 118 provides an upper, elongated U-shape that holds the front tire 302a into the front tire depression 116. The front tire alignment member 118 may hinge about the front tire 302a alignment to further secure the front tire 302a. A pair of lateral front tire alignment shafts 126a, 126b holds the front tire 302a from the sides into the front tire depression 116. The primary stabilization bar 110 and the secondary stabilization bar 112 help balance the weight of the multi-cycle support assembly 108. Thus, even if only a portion of the cycle racks 114a-c are loaded with a cycle 300a-c, the multi-cycle support assembly 108 remains balanced on the bowed pole 102. The aerial tramway 200 then carries the apparatus 100 and mounted cycles 300a-c to the destination for unloading.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A single pole aerial tramway apparatus for transporting bicycles via an aerial cable, the apparatus comprising:
a single bowed pole being defined by a pole cable end, a pole cycle end, and a medial region, the single bowed pole being configured to bow outwardly at the medial region, the pole cycle end being generally perpendicular to the pole cable end;
a cable extension member capable of engaging the aerial cable;
a hinged bracket disposed at the pole cable end and connected to the cable extension member;
a multi-cycle support assembly joined to the pole cycle end, the multi-cycle support assembly comprising:
a primary stabilization bar connected perpendicularly to the pole cycle end of the bowed pole;
at least one secondary stabilization bar connected perpendicularly to the pole cycle end of the bowed pole, the secondary stabilization bar disposed in a parallel, spaced-apart relationship with the primary stabilization bar; and
a plurality of cycle racks comprising an elongated panel defined by a front tire depression and a rear tire brace, the cycle racks being attached perpendicularly to the primary stabilization bar and the secondary stabilization bar, the cycle racks being disposed in a parallel, spaced-apart relationship with each other,
whereby the medial region of the single bowed pole bends distally from the cycle racks so as to create space for handle bars and front tires of the transported bicycles.

2. The apparatus of claim 1, wherein the bracket detachably attaches to the cable extension member.

3. The apparatus of claim 1, wherein the bowed pole is fabricated from metal.

4. The apparatus of claim 1, wherein the primary stabilization bar is disposed forward of the at least one secondary stabilization bar.

5. The apparatus of claim 1, wherein the cycle racks are configured to support a cycle.

6. The apparatus of claim 5, wherein the front tire depression of the cycle rack receives a front tire of the cycle.

7. The apparatus of claim 6, wherein the rear tire brace of the cycle rack receives a rear tire of the cycle.

8. The apparatus of claim 1, wherein the front tire depression of the cycle rack has a generally U-shape.

9. The apparatus of claim 1, further comprising a front tire alignment member extending from the front tire depression.

10. The apparatus of claim 1, further comprising a pair of lateral front tire alignment shafts disposed longitudinally along the front tire depression.

11. The apparatus of claim 10, wherein the hinge member of the bracket enables the bowed pole to sway in a pendulum motion.

12. A single pole aerial tramway apparatus for transporting bicycles via an aerial cable, the apparatus comprising:
a single bowed pole being defined by a pole cable end, a pole cycle end, and a medial region, the single bowed pole being configured to bow outwardly at the medial region, the pole cycle end being generally perpendicular to the pole cable end;
a cable extension member capable of engaging the aerial cable;
a hinged bracket disposed at the single pole cable end and connected to the cable extension member, the hinged bracket enabling the bowed pole to sway in a pendulum motion;
a multi-cycle support assembly joined to the pole cycle end, the multi-cycle support assembly comprising:
a primary stabilization bar connected perpendicularly to the pole cycle end of the bowed pole;
at least one secondary stabilization bar connected perpendicularly to the pole cycle end of the bowed pole, the secondary stabilization bar disposed in a parallel, spaced-apart relationship with the primary stabilization bar; and
a plurality of cycle racks comprising an elongated panel defined by a front tire depression and a rear tire brace, the cycle racks being attached perpendicularly to the primary stabilization bar and the secondary stabilization bar, the cycle racks being disposed in a parallel, spaced-apart relationship with each other, whereby the medial region of the bowed pole bends distally from the cycle racks so as to create space for handle bars and front tires of the transported bicycles, whereby the multi-cycle support assembly sways in a pendulum motion with the bowed pole.

13. The apparatus of claim 12, further comprising a front tire alignment member extending from the front tire depression.

14. The apparatus of claim 12, further comprising a pair of lateral front tire alignment shafts disposed longitudinally along the front tire depression.

15. A single pole aerial tramway apparatus for transporting bicycles via an aerial cable, the apparatus consisting of:
- a single bowed pole being defined by a pole cable end, a pole cycle end, and a medial region, the single bowed pole being configured to bow outwardly at the medial region, the pole cycle end being generally perpendicular to the pole cable end;
- a cable extension member engaging the aerial cable;
- a bracket disposed at the pole cable end, the bracket detachably attachable to the cable extension member from a cable of an aerial tramway;
- a multi-cycle support assembly joined to the pole cycle end, the multi-cycle support assembly comprising:
  - a primary stabilization bar connected perpendicularly to the pole cycle end of the bowed pole;
  - at least one secondary stabilization bar connected perpendicularly to the pole cycle end of the bowed pole, the secondary stabilization bar disposed in a parallel, spaced-apart relationship with the primary stabilization bar;
- a plurality of cycle racks comprising an elongated panel defined by a front tire depression and a rear tire brace, the flat panel having a textured surface, the front tire depression configured to receive a front tire of a cycle, the rear tire brace configured to receive a rear tire of the cycle, the cycle racks being attached perpendicularly to the primary stabilization bar and the secondary stabilization bar, the cycle racks being disposed in a parallel, spaced-apart relationship with each other, whereby the medial region of the bowed pole bends distally from the cycle racks, so as to create space for handle bars and front tires of the transported bicycles;

- a front tire alignment member extending from the front tire depression, the tire alignment member being defined by an elongated U-shape; and
- a pair of lateral front tire alignment shafts disposed longitudinally along the front tire depression.

* * * * *